US011148675B2

(12) United States Patent
Chu

(10) Patent No.: US 11,148,675 B2
(45) Date of Patent: Oct. 19, 2021

(54) APPARATUS AND METHOD OF SHARING A SENSOR IN A MULTIPLE SYSTEM ON CHIP ENVIRONMENT

(71) Applicant: QUALCOMM Incorporated, San Diego, CA (US)

(72) Inventor: Jeffrey Hao Chu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 644 days.

(21) Appl. No.: 16/055,842

(22) Filed: Aug. 6, 2018

(65) Prior Publication Data
US 2020/0039524 A1 Feb. 6, 2020

(51) Int. Cl.
| | |
|---|---|
| *G06K 9/00* | (2006.01) |
| *G06F 15/78* | (2006.01) |
| *B60W 50/00* | (2006.01) |
| *B60W 50/04* | (2006.01) |
| *B60W 50/14* | (2020.01) |
| *G07C 5/00* | (2006.01) |
| *G07C 5/08* | (2006.01) |
| *G06F 13/10* | (2006.01) |
| *G06F 115/02* | (2020.01) |

(52) U.S. Cl.
CPC ...... *B60W 50/0098* (2013.01); *B60W 50/045* (2013.01); *B60W 50/14* (2013.01); *G06F 13/10* (2013.01); *G06F 15/7807* (2013.01); *G06K 9/00791* (2013.01); *G07C 5/008* (2013.01); *G07C 5/0841* (2013.01); *B60W 2050/0005* (2013.01); *B60W 2050/0043* (2013.01); *B60W 2050/0094* (2013.01); *B60W 2420/403* (2013.01); *G06F 2115/02* (2020.01); *G06F 2213/0038* (2013.01)

(58) Field of Classification Search
CPC ....... G06F 15/7807; B60W 2050/0094; G06K 9/00791
See application file for complete search history.

(56) References Cited

U.S. PATENT DOCUMENTS

| | | | |
|---|---|---|---|
| 9,165,196 B2 | 10/2015 | Kesavan et al. | |
| 9,503,747 B2 | 11/2016 | Satpathy et al. | |
| 9,910,481 B2 | 3/2018 | Lee et al. | |
| 2015/0365664 A1 | 12/2015 | Yousefi et al. | |

(Continued)

FOREIGN PATENT DOCUMENTS

EP 2881752 A1 6/2015

OTHER PUBLICATIONS

International Search Report and Written Opinion—PCT/US2019/044975—ISA/EPO—dated Nov. 26, 2019.

*Primary Examiner* — Zachary K Huson
(74) *Attorney, Agent, or Firm* — Qualcomm Incorporated

(57) ABSTRACT

Examples disclosed herein provide mechanisms for controlling a sensor in a multiple System on Chip (SoC) environment that allows one of the multiple System on Chips to be selected as a host System on Chip. The host System on Chip may lock the sensor to apply setting updates only from the host System on Chip that has locked the sensor. This lock may be broadcast to all sensors over an embedded data channel sent to all System on Chips receiving the sensor data. In addition, a safety monitor may be included to detect if the host System on Chip is functioning properly so that another System on Chip may be selected as a new host System on Chip.

20 Claims, 7 Drawing Sheets

(56) References Cited

U.S. PATENT DOCUMENTS

| | | |
|---|---|---|
| 2017/0039084 A1 | 2/2017 | Atsmon et al. |
| 2017/0278323 A1 | 9/2017 | Gupta et al. |
| 2019/0243376 A1* | 8/2019 | Davis .................... H04N 5/247 |
| 2019/0250611 A1* | 8/2019 | Costin .................... G05B 9/03 |

* cited by examiner

APPARATUS AND METHOD OF SHARING A SENSOR IN A MULTIPLE SYSTEM ON CHIP ENVIRONMENT

FIELD OF DISCLOSURE

This disclosure relates generally to multiple System on Chips (SoCs) environments, and more specifically, but not exclusively, to sharing a sensor in multiple SoCs environments.

BACKGROUND

Automotive Safety Integrity Level (ASIL) is a risk classification scheme defined by the ISO 26262—Functional Safety for Road Vehicles standard (incorporated herein by reference). This is an adaptation of the Safety Integrity Level used in IEC 61508 for the automotive industry. This classification helps defining the safety requirements necessary to be in line with the ISO 26262 standard. The ASIL is established by performing a risk analysis of a potential hazard by looking at the Severity, Exposure and Controllability of the vehicle operating scenario. The safety goal for that hazard in turn carries the ASIL requirements. There are four ASILs identified by the standard: ASIL A, ASIL B, ASIL C, ASIL D. ASIL D dictates the highest integrity requirements on the product and ASIL A the lowest.

In recent years, technology companies have begun developing and implementing technologies that assist drivers in avoiding accidents and enabling an automobile to drive itself. So called "self-driving cars" include sophisticated sensor and processing systems that control the vehicle based on information collected from the car's sensors, processors, and other electronics, in combination with information (e.g., maps, traffic reports, etc.) received from external networks (e.g., the "Cloud"). As self-driving and driver-assisting technologies grow in popularity and use, so will the importance of protecting motor vehicles from malfunction. Due to these emerging trends, new and improved solutions that better identify, prevent and respond to misinformation on modern vehicles, such as autonomous vehicles and self-driving cars, will be beneficial to consumers.

For example, camera, radar, and LIDAR sensors may be located around a car to observe the environment. These sensors are all combined via "sensor fusion" to produce the tactical aspects of self-driving, such as increase speed, lane change, break, etc. ASIL-D can be achieved with redundancy of multiple SoCs. The sensors will be fed to multiple SoCs in this model to achieve ASIL-D.

In an Autonomous Vehicle System, a camera sensor may feed multiple SoCs for redundancy processing. Camera control requires a feedback loop of a host SoC updating the camera configuration for future frames based on analysis of the current frame. When the sensor feeds two SoCs, the two SoCs may send differing sensor configuration parameters or updates to the sensor. This may create a malfunction or confusion to the receiving SoCs. From an automotive safety perspective, a common safety feature is to check to see that for a given received image frame, the camera sensor settings applied on the captured frame match those issued by the host SoC. For example, a feedback loop from a SoC to a camera sensor may include auto white balance and auto exposure settings configured in camera sensor registers based on previous camera video stream data. Other configuration information may be updated as well (i.e., HDR mode vs. linear mode). Along with pixel data from camera sensors, embedded data containing information about the configuration settings applied to the sensor to capture the pixel data in the frame is sent across the link from the camera sensor to the SoC. A safety challenge is encountered wherein the system is unable to determine which SoC settings are to be applied to control the feedback loop and which SoC settings to perform safety check validation upon. If different SoCs, or the same SoCs with different algorithms, control the feedback loop, conventional systems are unable to determine which SoC controls the settings to the sensor on the feedback loop or how to communicate this to the sensor.

Accordingly, there is a need for systems, apparatus, and methods that overcome the deficiencies of conventional approaches including the methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example.

Accordingly, the following summary has the sole purpose to present certain concepts relating to one or more aspects and/or examples relating to the apparatus and methods disclosed herein in a simplified form to precede the detailed description presented below.

In one aspect, a sensor control apparatus comprises: a first System on Chip (SoC) configured to generate a first sensor configuration value for a sensor parameter; a second SoC configured to generate a second sensor configuration value for the sensor parameter; a sensor communicatively coupled to the first SoC and the second SoC; and a control logic circuit communicatively coupled to the first SoC, the second SoC, and the sensor, wherein the control logic circuit is configured to select between the first SoC and the second SoC as a host SoC and to apply to the sensor one of the first configuration value or the second configuration value for the sensor parameter based on the selected host SoC.

In another aspect, a method for controlling a sensor comprises: generating a first sensor configuration value for a sensor parameter by a first System on Chip (SoC) communicatively coupled to a sensor and a control logic circuit; generating a second sensor configuration value for the sensor parameter by a second SoC communicatively coupled to the sensor and the control logic circuit; selecting between the first SoC and the second SoC as a host SoC; and applying one of the first configuration value or the second configuration value for the sensor parameter based on the selected host SoC to the sensor.

In still another aspect, a non-transitory computer-readable medium comprising instructions that when executed by a processor cause the processor to perform a method comprising: generating a first sensor configuration value for a sensor parameter by a first System on Chip (SoC) communicatively coupled to a sensor and a control logic circuit; generating a second sensor configuration value for the sensor parameter by a second SoC communicatively coupled to the sensor and the control logic circuit; selecting between the first SoC and the second SoC as a host SoC; and applying one of the first configuration value or the second configuration value for the sensor parameter based on the selected host SoC.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
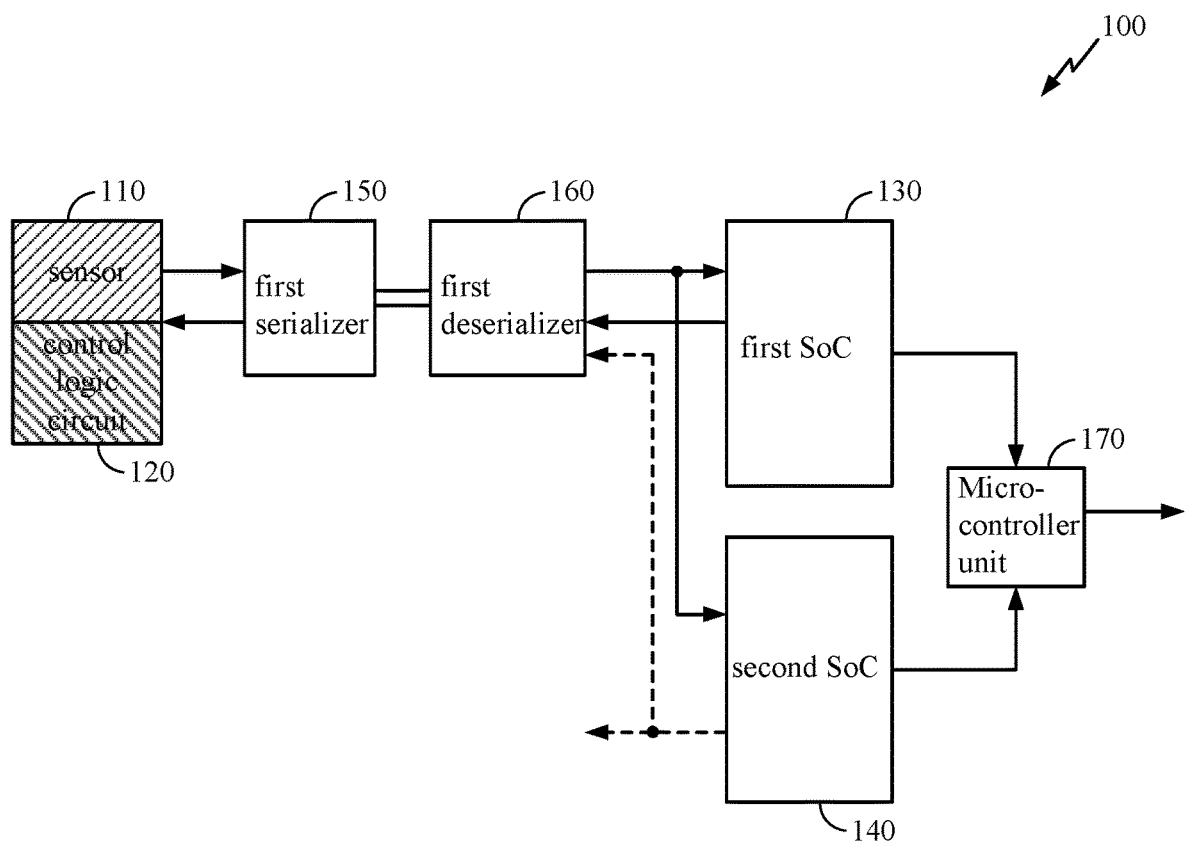
FIG. 1 illustrates a sensor control apparatus in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein mitigate shortcomings of the conventional methods, apparatus, and systems, as well as other previously unidentified needs. For example, a sensor control apparatus may include a sensor control logic that selects a host System on Chip from among a plurality of System on Chips to provide input, such as parameters, for the sensor while preventing the sensor from applying input from non-selected System on Chips to avoid a sensor from receiving conflicting input that may affect the sensor operation. The sensor control apparatus may provide a method to allow a single sensor to broadcast what SoC has control of the sensor without additional inter-SoC bus(es) for communication, enable another SoC to take control of the sensor when the owning SoC intentionally or unintentionally relinquishes control, and provide additional system level functional safety checks in an autonomous vehicle environment.

In overview, the various examples disclosed herein include methods, as well as computing systems configured to execute the methods, for monitoring and analysis of sensor information in a vehicle to efficiently identify, prevent, correct, or otherwise respond to various abnormal conditions and behaviors in/of the vehicle, such as sensor malfunctions. A computing system may be configured to monitor a sensor in or near the vehicle to collect the sensor information, analyze the collected sensor information to generate an analysis result, and determine whether a behavior of the sensor or computing system is abnormal based on the generated analysis result.

The computing system may be, or may be implemented in, a mobile computing device, the vehicle's control systems, or a combination thereof. The monitored sensors may include any combination of closely-integrated vehicle sensors (e.g., camera sensor, radar sensor, LIDAR sensor, etc.). The term sensor may include a sensor interface (such as a serializer or deserializer), a camera sensor, a radar sensor, a LIDAR sensor or similar sensor.

The term "system on chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SoCs may also include software for controlling the integrated resources and processors, as well as for controlling peripheral devices.

Over the past several years, the modern automobile has been transformed from a self-propelled mechanical vehicle into a powerful and complex electro-mechanical system that includes a large number of sensors, processors, and SoCs that control many of the vehicle's functions, features, and operations. Modern vehicles now also are equipped with a vehicle control system, which may be configured to collect and use information from the vehicle's various systems and sensors to automate all or a portion of the vehicle's operations.

For example, manufacturers now equip their automobiles with an Advanced Driver Assistance System (ADAS) that automates, adapts, or enhances the vehicle's operations. The ADAS may use information collected from the automobile's sensors (e.g., accelerometer, radar, LIDAR, geospatial positioning, etc.) to automatically detect a potential road hazard, and assume control over all or a portion of the vehicle's operations (e.g., braking, steering, etc.) to avoid detected hazards. Features and functions commonly associated with an ADAS include adaptive cruise control, automated lane detection, lane departure warning, automated steering, automated braking, and automated accident avoidance.

In various implementations, a processor in the computing system may be coupled to all (or many) of the vehicle's sensors and systems via wired and/or wireless links, including the mobile devices of its passengers. The processor may collect information from a large number of diverse and disparate sensors/systems, and use a combination of the collected information to determine whether there are abnormalities in sensor outputs, system outputs, system operations, etc.

FIG. 1 illustrates a sensor control apparatus in accordance with some examples of the disclosure. As shown in FIG. 1, a sensor control apparatus 100 may include a sensor 110 (e.g., a camera, a radar, a LIDAR, etc.), a control logic circuit 120 communicatively coupled to the sensor 110, a first System on Chip (SoC) 130 communicatively coupled to the sensor 110 and the control logic circuit 120, a second SoC 140 communicatively coupled to the sensor 110 and the control logic circuit 120. The first SoC 130 may be configured to generate a first sensor parameter, such as analog gain, digital gain, black level, polarized white light setting, general status, and debug status. The second SoC 140 may be configured to generate a second sensor parameter, such as analog gain, digital gain, black level, polarized white light setting, general status, and debug status. These sensor parameters may be used to control operation of the sensor 110. The control logic circuit 120 may be configured to select between the first SoC 130 and the second SoC 140 as a host SoC. The control logic circuit 120 may be configured to transmit parameters generated by the selected host SoC to the camera, such as the first sensor parameters or the second sensor parameters. The host SoC's generated parameters may be used to control operation of the sensor 110 by using the parameters generated by the host SoC instead of parameters generated by a non-selected SoC. While one sensor and two SoCs are illustrated in this example, it should be understood that more than one sensor and/or more than two SoCs may be included in the sensor control apparatus 100.

The sensor control apparatus 100 may include a first serializer 150 and a first deserializer 160 coupled between the sensor 110, the first SoC 130 and the second SoC 140. The first serializer 150 and the first deserializer 160 may be configured to convert between serial data and parallel interfaces in both directions to provide data transmission over a single or differential line by minimizing the number of I/O pins and connections. The first serializer 150 and the first deserializer 160 may convert parallel data into serial data (and vice versa) so that they can travel over media that does not support parallel data or used in order to save bandwidth. The first serializer 150 and the first deserializer 160 may transmit sensor data and embedded data between the sensor 110, the first SoC 130 and the second SoC 140. The sensor data may be pixel data from an active frame in the case of a camera and the embedded data may be register settings, statistics, safety data, and Media Access Control data for the sensor 110, the first SoC 130, and the second SoC 140. The sensor control apparatus 100 may also include a microcontroller unit 170 configured to make second level decisions on automotive safety issues in conformance with ASIL-D.

Figure 2:
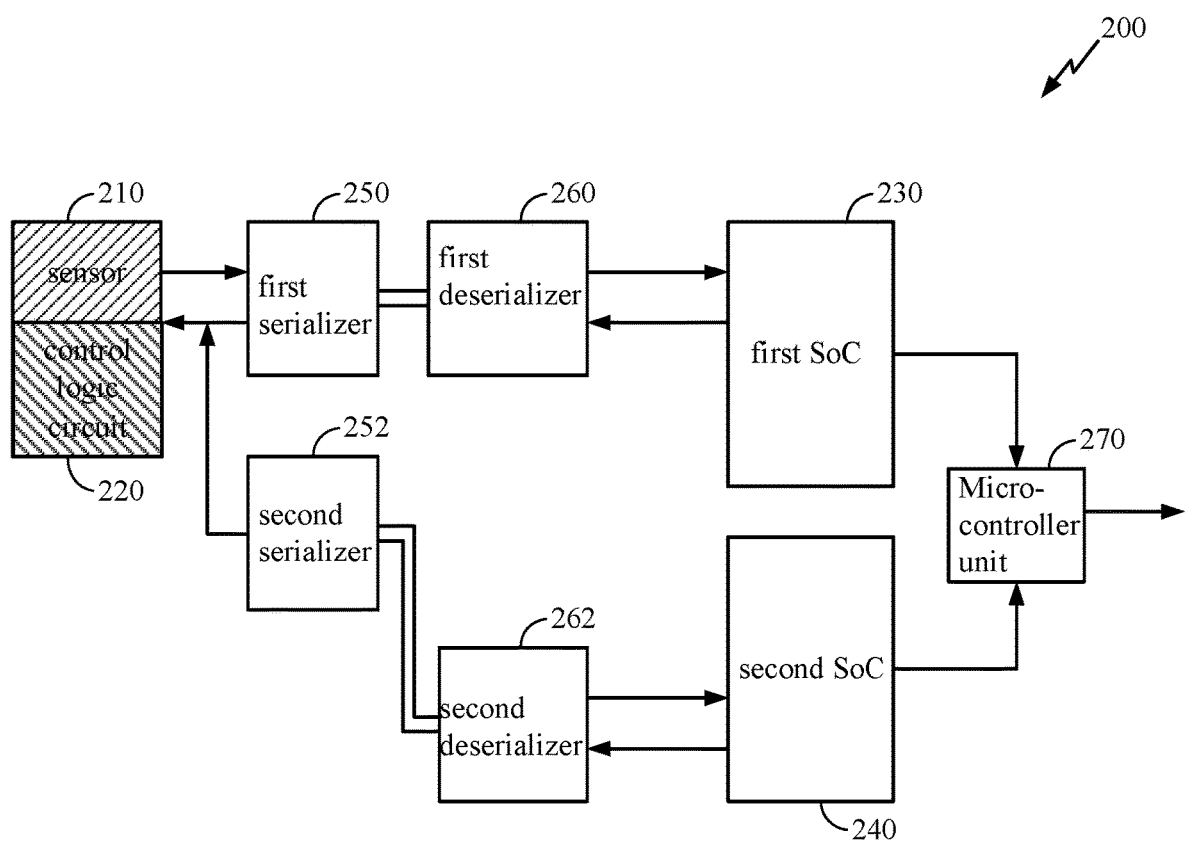
FIG. 2 illustrates a sensor control apparatus with two links to a sensor in accordance with some examples of the disclosure.

FIG. 2 illustrates a sensor control apparatus with two links to a sensor in accordance with some examples of the disclosure. As shown in FIG. 2, a sensor control apparatus 200 (e.g., sensor control apparatus 100) may include a sensor 210 (e.g., a camera, a radar, a LIDAR, etc.), a control logic circuit 220 communicatively coupled to the sensor 210, a first System on Chip (SoC) 230 communicatively coupled to the sensor 210 and the control logic circuit 220, a second SoC 240 communicatively coupled to the sensor 210 and the control logic circuit 220. The first SoC 230 may be configured to generate a first sensor parameter, such as analog gain, digital gain, black level, polarized white light setting, and exposure time. The second SoC 240 may be configured to generate a second sensor parameter, such as analog gain, digital gain, black level, polarized white light setting, and exposure time. These sensor parameters may be used to control operation of the sensor 210. The control logic circuit 220 may be configured to select between the first SoC 230 and the second SoC 240 as a host SoC. The control logic circuit 220 may be configured to transmit parameters generated by the selected host SoC to the camera, such as the first sensor parameters or the second sensor parameters. The host SoC's generated parameters may be used to control operation of the sensor 210 by using the parameters generated by the host SoC instead of parameters generated by a non-selected SoC. While one sensor and two SoCs are illustrated in this example, it should be understood that more than one sensor and/or more than two SoCs may be included in the sensor control apparatus 200.

The sensor control apparatus 200 may include a first serializer 250 and a first deserializer 260 coupled between the sensor 210 and the first SoC 230. The sensor control apparatus 200 may also include a second serializer 252 and a second deserializer 262 coupled between the sensor 210 and the second SoC 240. The first serializer 250 and the first deserializer 260 may transmit sensor data and embedded data between the sensor 210 and the first SoC 230. The second serializer 252 and the second deserializer 262 may transmit sensor data and embedded data between the sensor 210 and the second SoC 240. This enables communication between the sensor 210 and one of the first SoC 230 and the second SoC 240 in case one of the serializer/deserializer links is disabled. The sensor control apparatus 200 may also include a microcontroller unit 270 configured to make second level decisions on automotive safety issues in conformance with ASIL-D.

Figure 3:
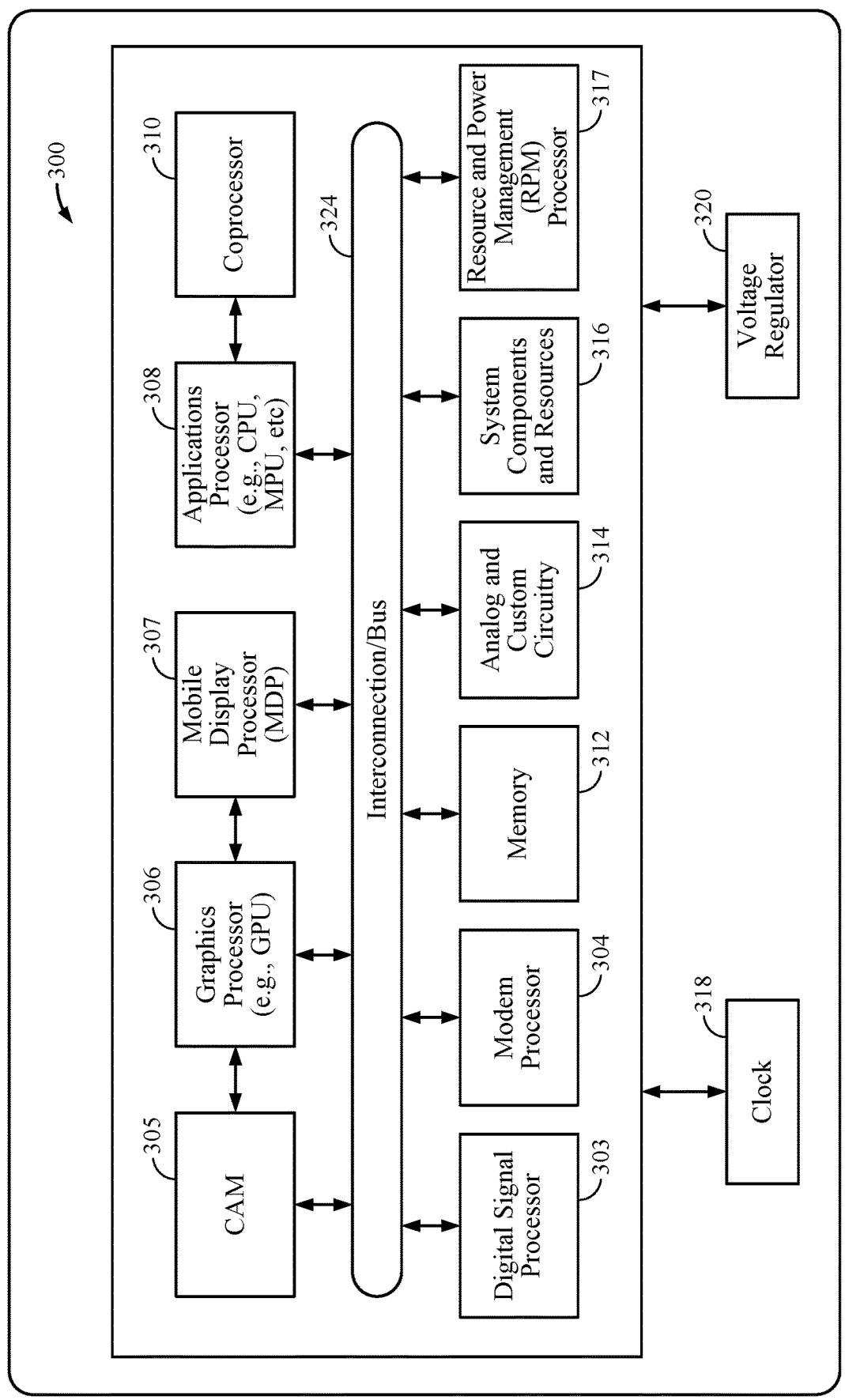
FIG. 3 illustrates an example system-on-chip (SoC) in accordance with some examples of the disclosure.

FIG. 3 illustrates an example SoC 300 (e.g., first SoC 130, first SoC 230, second SoC 140, and second SoC 240) architecture that may be used in mobile devices implementing the various examples herein. The SoC 300 may include a number of heterogeneous processors, such as a digital signal processor (DSP) 303, a modem processor 304, a graphics processor 306, a mobile display processor (MDP) 307, an applications processor 308, and a resource and power management (RPM) processor 317. The SoC 300 may also include one or more coprocessors 310 (e.g., vector co-processor) connected to one or more of the heterogeneous processors 303, 304, 306, 307, 308, 317. Each of the processors 303, 304, 306, 307, 308, 317 may include one or more cores, and an independent/internal clock. Each processor/core may perform operations independent of the other processors/cores. For example, the SoC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SoC's 300 main processor, central processing unit (CPU), microprocessor unit (MPU), arithmetic logic unit (ALU), etc. The graphics processor 306 may be the graphics processing unit (GPU).

The SoC 300 may include analog circuitry and custom circuitry 314 for managing sensor data, analog-to-digital conversions, wireless data transmissions, and for performing other specialized operations, such as processing encoded audio and video signals for rendering in a web browser. The SoC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device. The SoC 300 also includes specialized circuitry (CAM) 305 that includes, provides, controls and/or manages the operations of one or more cameras (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

The system components and resources 316, analog and custom circuitry 314, and/or CAM 305 may include circuitry to interface with peripheral devices, such as cameras, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high performance networks-on-chip (NoCs).

The SoC 300 may further include an input/output module (not illustrated) for communicating with resources external to the SoC 300, such as a clock 318 and a voltage regulator 320. Resources external to the SoC 300 (e.g., clock 318, voltage regulator 320) may be shared by two or more of the internal SoC processors/cores (e.g., a DSP 303, a modem processor 304, a graphics processor 306, an applications processor 308, etc.).

In some examples, the SoC 300 may be included in a computing device, which may be included in an automobile. The computing device may include communication links for communication with a telephone network, the Internet, and/or a network server. Communication between the computing device and the network server may be achieved through the telephone network, the Internet, private network, or any combination thereof.

The SoC 300 may also include additional hardware and/or software components that are suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components (e.g., accelerometer, etc.) of modern electronic devices.

Figure 4:
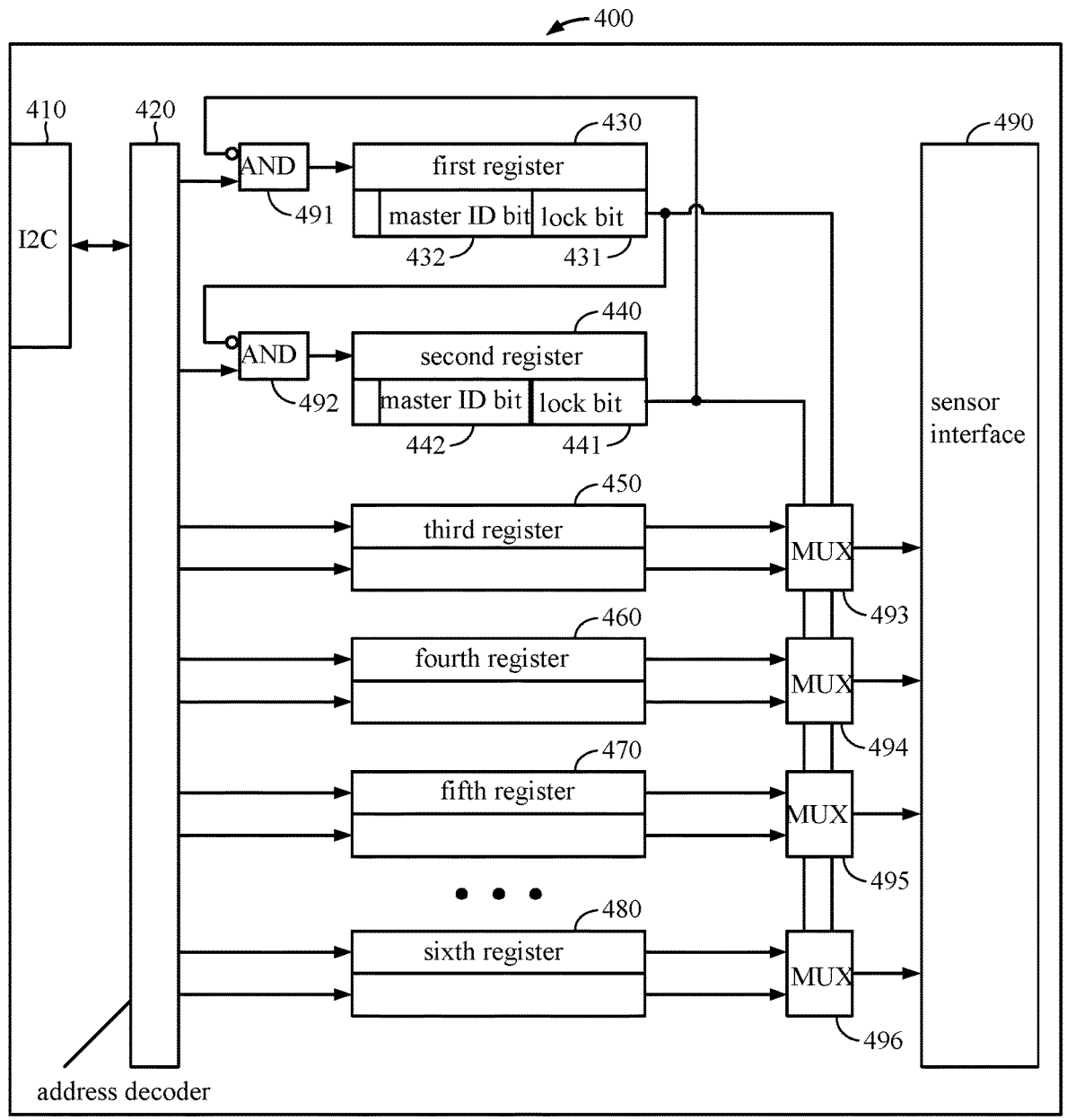
FIG. 4 illustrates a sensor in accordance with some examples of the disclosure.

FIG. 4 illustrates a sensor in accordance with some examples of the disclosure. As shown in FIG. 4, a sensor 400 (e.g., sensor 110 and sensor 210) may include an I2C 410 that provides a bus for intra-board communication between the sensor 400 and a serializer/deserializer (not shown) and SoCs (not shown), an address decoder 420 coupled to the I2C 410, a first register 430, a second register 440, a third register 450, a fourth register 460, a fifth register 470, and a sixth register 480. Although six registers are shown in FIG. 4, it should be understood that the sensor 400 may include more than six registers depending on the number of parameters used by the sensor 400 and the number of SoCs providing parameters to the sensor 400. The sensor 400 may also include a sensor interface 490 that provides a pixel array and a data path for interfacing with sensing elements (not shown) of the sensor 400.

The first register 430 may be configured to store a first lock bit 431 and a first master ID bit or bits 432 that allows the sensor 400 to identify, lock, and store parameters from a selected host SoC (not shown). The second register 440 may be configured to store a second lock bit 441 and a second master ID bit or bits 442 that allows the sensor 400 to identify, lock, and store parameters from a selected host SoC (not shown). While two such registers 430 and 440 are shown, it should be understood that more than two such registers may be included in sensor 400 depending on the number of SoCs providing parameter inputs to the sensor 400.

The third register 450 may be configured to store a sensor parameter, such as analog gain, from each of the SoCs providing input to the sensor 400. The fourth register 460 may be configured to store a sensor parameter, such as digital gain, from each of the SoCs providing input to the sensor 400. The fifth register 470 may be configured to store a sensor parameter, such as exposure time, from each of the SoCs providing input to the sensor 400. The sixth register 480 may be configured to store a sensor parameter, such as a register configuration, from each of the SoCs providing input to the sensor 400. While four such registers are shown, it should be understood that more than four may be included depending on how many parameters are providing input to sensor 400 and each such register may be configured to store parameters for the number of SoCs providing input to the sensor 400.

The sensor 400 also includes a first AND logic element 491 coupled to the first register 430, a second AND logic element 492 coupled to the second register, a first multiplexer 493 coupled to the third register 450, a second multiplexer 494 coupled to the fourth register 460, a third multiplexer 495 coupled to the fifth register 470, and a fourth multiplexer 496 coupled to the sixth register 480. Thus, the sensor 400 may include an AND logic element for each SoC associated register and a multiplexer for each parameter associated register.

The AND logic elements 491 and 492 in conjunction with the multiplexers 493-496 enable the sensor 400 to select which SoC parameters are providing input to the sensor element. Thus, if the first register 430 and the second register 440 enable a lock on control of the sensor settings where each SoC owns a context/address space (in the third through sixth registers 450, 460, 470, 480) in the sensor 400 where it has its own set of configuration registers for the sensor 400 that it may write to without interfering with the SoC that has locked the sensor 400. For example, a first command to sensor 400 from each SoC is to write "Lock Bit" to SENSOR_MASTER register address (e.g., the first register 430 and the second register 440). The Power/Wake Up time could vary per SoC—first SoC to lock sensor "wins". Setting the lock bit (e.g., lock bits 431,441) prevents any other SoC from locking the sensor 400. Optionally, each SoC can perform a read to its SENSOR_MASTER register to see if it was able to lock the sensor 400. If for a SoC it reads the Lock Bit and it is not set, then the SoC knows that another SoC has locked the sensor 400. Each SoC may write its desired settings into its context/address space and may unlock and allow another SoC to gain lock by de-asserting its own Lock Bit. This enables all SoCs to understand who owns the sensor settings or why local SoC sensor settings are not being applied when observing the register configuration settings that are sent over the embedded data. Also sensor 400 may broadcast when lock is removed so other SoCs can initiate a lock on the sensor 400. For example, SENSOR_MASTER register bit information may be transferred as embedded data and broadcast to all SoCs receiving the data stream from the sensor 400. Either hardware or software in the SoC can check the embedded data to "know" which SoC has locked and is in control of the sensor 400. Each SoC's feedback loop processing input to update the sensor settings may still run, issuing its own settings into its allocated context/address space on the sensor 400.

Figure 5:
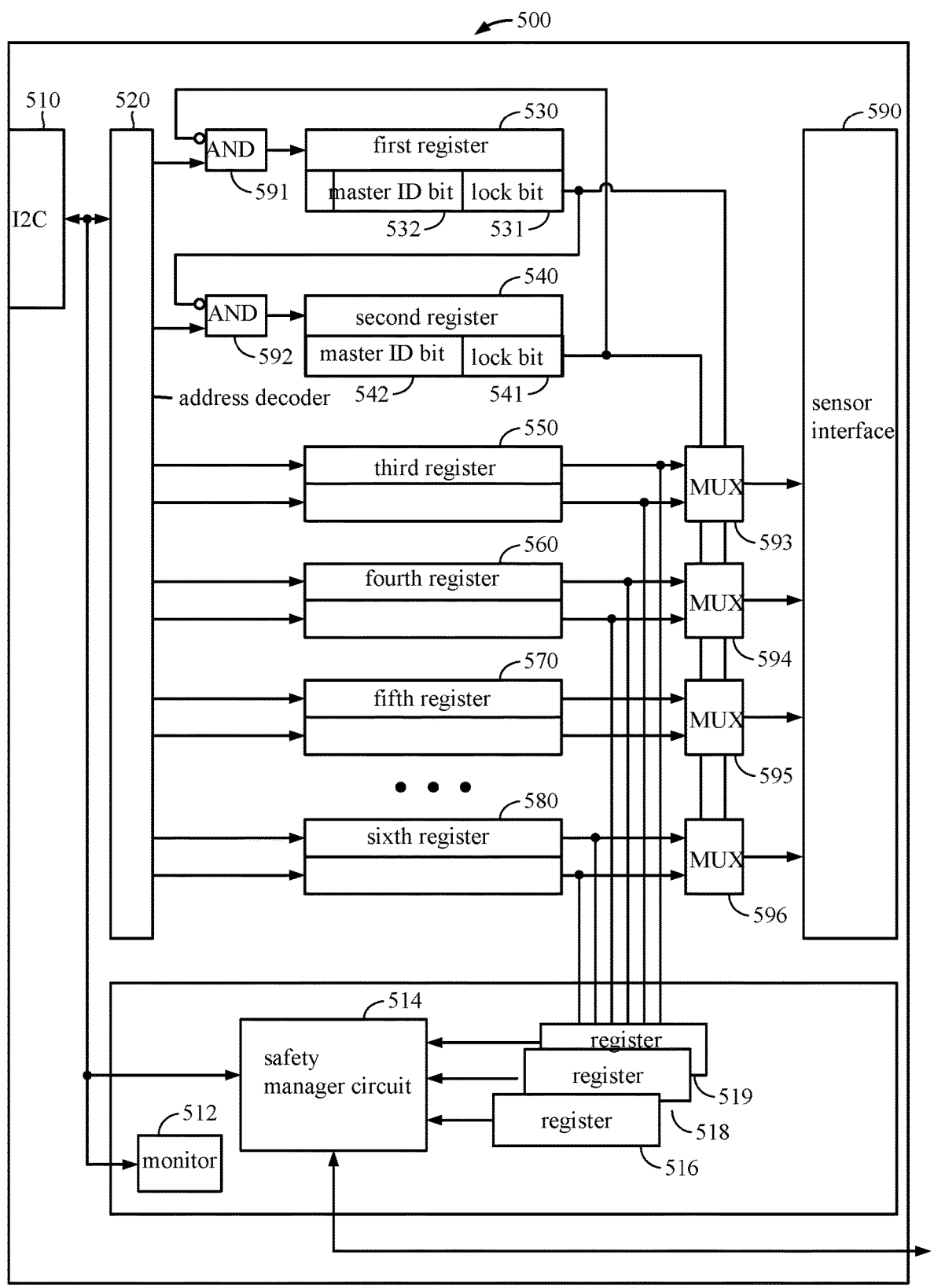
FIG. 5 illustrates a sensor with a monitor in accordance with some examples of the disclosure.

FIG. 5 illustrates a sensor with a monitor in accordance with some examples of the disclosure. As shown in FIG. 5, a sensor 500 (e.g., sensor 110, sensor 210, and sensor 400) may include an I2C 510 that provides a bus for intra-board communication between the sensor 500 and a serializer/deserializer (not shown) and SoCs (not shown), an address decoder 520 coupled to the I2C 510, a first register 530, a second register 540, a third register 550, a fourth register 560, a fifth register 570, and a sixth register 580. Although six registers are shown in FIG. 5, it should be understood that the sensor 500 may include more than six registers depending on the number of parameters used by the sensor 500 and the number of SoCs providing parameters to sensor 500. The sensor 500 may also include a sensor interface 590 that provides a pixel array and a data path for interfacing with sensing element (not shown) of the sensor 500.

The first register 530 may be configured to store a first lock bit 531 and a first master ID bit or bits 532 that allows the sensor 500 to identify, lock, and store parameters from a selected host SoC (not shown). The second register 540 may be configured to store a second lock bit 541 and a second master ID bit or bits 542 that allows the sensor 500 to identify, lock, and store parameters from a selected host SoC (not shown). While two such registers 530 and 540 are shown, it should be understood that more than two such registers may be included in sensor 500 depending on the number of SoCs providing parameter inputs to the sensor 500.

The third register 550 may be configured to store a sensor parameter, such as analog gain, from each of the SoCs providing input to the sensor 500. The fourth register 560 may be configured to store a sensor parameter, such as digital gain, from each of the SoCs providing input to the sensor 500. The fifth register 570 may be configured to store a sensor parameter, such as exposure time, from each of the SoCs providing input to the sensor 500. The sixth register 580 may be configured to store a sensor parameter, such as a register configuration, from each of the SoCs providing input to the sensor 500. While four such registers are shown, it should be understood that more than four may be included depending on how many parameters are input to sensor 500 and each such register may be configured to store parameters for the number of SoCs providing input to the sensor 500.

The sensor 500 also includes a first AND logic element 591 coupled to the first register 530, a second AND logic element 592 coupled to the second register, a first multiplexer 593 coupled to the third register 550, a second multiplexer 594 coupled to the fourth register 560, a third multiplexer 595 coupled to the fifth register 570, and a fourth multiplexer 596 coupled to the sixth register 580. Thus, the sensor 500 may include an AND logic element for each SoC associated register and a multiplexer for each parameter associated register.

The AND logic elements 591 and 592 in conjunction with the multiplexers 593-596 enable the sensor 500 to select which SoC parameters are input to the sensor element. Thus, if the first register 530 and the second register 540 enables a lock on control of sensor settings where each SoC owns a context/address space (in the third through sixth registers 550, 560, 570, 580) in the sensor 500 where it has its own set of configuration registers for the sensor 500 that it may write to without interfering with the SoC that has locked the sensor. For example, a first command to sensor 500 from each SoC is to write "Lock Bit" to SENSOR_MASTER register address (e.g., the first register 530 and the second register 540). The Power/Wake Up time could vary per SoC—first SoC to lock sensor "wins". Setting the lock bit (e.g., lock bits 531, 541) prevents any other SoC from locking the sensor 500. Optionally, each SoC can perform a read to its SENSOR_MASTER register to see if it was able to lock the sensor 500. If for a SoC it reads the Lock Bit and it is not set, then the SoC knows that another SoC has locked the sensor 500. Each SoC may write its desired settings into its context/address space and may unlock and allow another SoC to gain lock by de-asserting its own Lock Bit. This enables all SoCs to understand who owns the sensor settings or why local SoC sensor settings are not being applied. Also sensor 500 may broadcast when lock is removed so other SoCs can initiate a lock on the sensor 500. For example, SENSOR_MASTER register bit information may be transferred as embedded data and broadcast to all SoCs receiving the data stream from the sensor 500. Either hardware or software in the SoC can check the embedded data to "know" which SoC has locked and is in control of the sensor 500. Each SoC's feedback loop processing input to update the sensor settings may still run, issuing its own settings into its allocated context/address space on the sensor 500.

The sensor 500 may also include additional sets of registers intended to be used to change actual context/configuration from a single SoC (at frame boundaries in a camera sensor, for example). This additional context set can be used to enable safety checks at the system level. Sensor 500 may include a system safety check or threshold check. For example:

1) In an ideal world, if same SoC and software is used, resulting feedback loop settings to sensor 500 should result in the same values. For each critical register setting that are updated dynamically based on feedback loop, add comparator/XOR logic to identify deltas which could be the result of faults. A running count of discrepancies may be maintained. If discrepancies exceed some threshold value, tit may indicate an issue in one of the SoCs.

2) If two different SoCs or software algorithms are used, the resulting feedback loop settings to sensor 500 should result in similar values. For each critical register setting that are updated dynamically based on feedback loop, add comparator logic to identify deltas which are within a threshold of each other. Any results that exceed the threshold should be reported or flagged as there may be an issue in one of the SoCs.

3) The discrepancy data/information can be read via registers or broadcast to SoCs as embedded data over the data link to the SoCs.

As shown in FIG. 5, the sensor 500 may include a monitor 512 coupled to the I2C 510 and the address decoder 520, a safety manager circuit 514 coupled to the I2C 510 and the address decoder 520, a first threshold compare register 516 coupled to the safety manager circuit 514, a second threshold compare register 518 coupled to the safety manager circuit 514, and a third threshold compare register 519 coupled to the safety manager circuit 514. While three threshold compare registers are shown, it should be understood that more than or less than three may be included depending on the number of registers for which updates will be compared to a threshold value. The safety manager circuit 514 may include a timer (not shown). The monitor 512 and the safety manager circuit 514, in conjunction with the threshold compare registers 516-519, may be used to record a number of register updates from the host SoC; determine if the number of register updates exceeds a threshold; deselect the host SoC when the number of register updates does not exceed the threshold; and broadcast a release signal to the control logic circuit, the first SoC, and the second SoC when the host SoC is deselected For Example, Sensor 500 May Include a Safety Check by:
1) Add a timer (watchdog or free running) to the sensor 500.
2) Record the number of register updates from the SoC that has the lock. Typically, there should be updates for each frame of camera data, for example.
3) If there are not enough updates from the host SoC in a predefined window (e.g., at least one update per five frames), release the lock in sensor. An insufficient number of updates may indicate there is some issue with the host SoC control itself.

4) Release of lock will be broadcast to all SoCs,
5) Other SoCs now have an opportunity to lock sensor 500 and apply "valid" settings that were not being received by the sensor 500 to enable other SoCs from receiving properly configured data from the sensor (i.e., exit from dark tunnel to daylight will require sensor settings to be updated).

Figure 6:
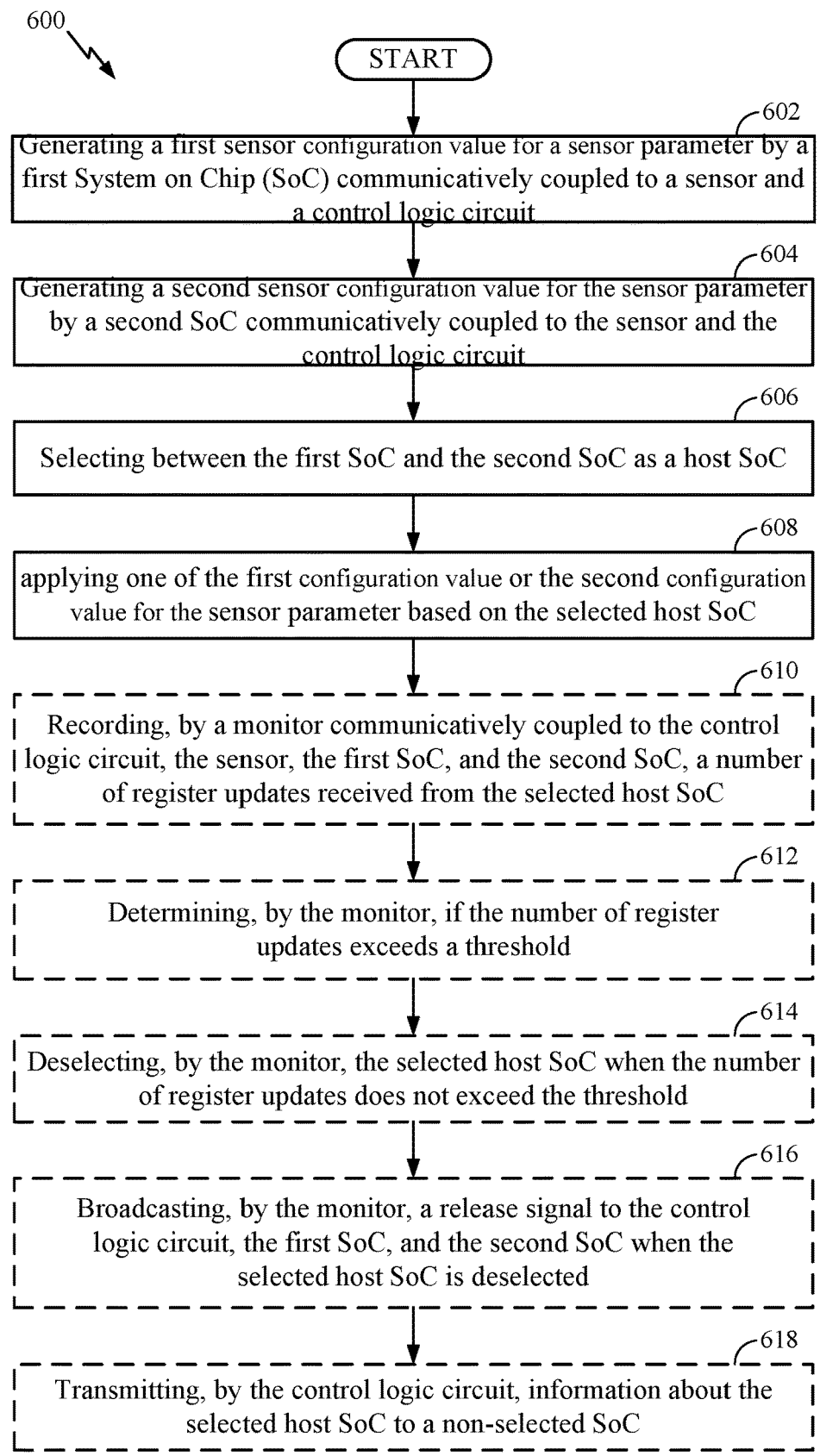
FIG. 6 illustrates a partial method for controlling a sensor in accordance with some examples of the disclosure.

FIG. 6 illustrates a partial method for controlling a sensor in accordance with some examples of the disclosure. As shown in FIG. 6, a partial method 600 of controlling a sensor (e.g., sensor 110, sensor 210, sensor 400, and sensor 500) begins in block 602 with generating a first sensor configuration value for a sensor parameter by a first System on Chip (SoC) communicatively coupled to a sensor and a control logic circuit. The partial method 600 continues in block 604 with generating a second sensor configuration value for the sensor parameter by a second SoC communicatively coupled to the sensor and the control logic circuit. The partial method 600 continues in block 606 with selecting between the first SoC and the second SoC as a host SoC. The partial method 600 may conclude in block 608 with applying one of the first configuration value or the second configuration value for the sensor parameter based on the selected host SoC. Optionally, the partial method 600 continues in block 610 with recording, by a monitor communicatively coupled to the control logic circuit, the sensor, the first SoC, and the second SoC, a number of register updates received from the selected host SoC. The partial method 600 continues in block 612 with determining, by the monitor, if the number of register updates exceeds a threshold. The partial method 600 continues in block 614 with deselecting, by the monitor, the selected host SoC when the number of register updates does not exceed the threshold. The partial method 600 may conclude in block 616 with broadcasting, by the monitor, a release signal to the control logic circuit, the first SoC, and the second SoC when the selected host SoC is deselected or also include block 618 with transmitting, by the control logic circuit, information about the selected host SoC to a non-selected SoC. While broadcasting a release signal has been shown in FIG. 6, it should be understood that each SoC may alternatively scan one or more of the registers in the sensor to determine which SoC has a lock on the sensor.

Figure 7:
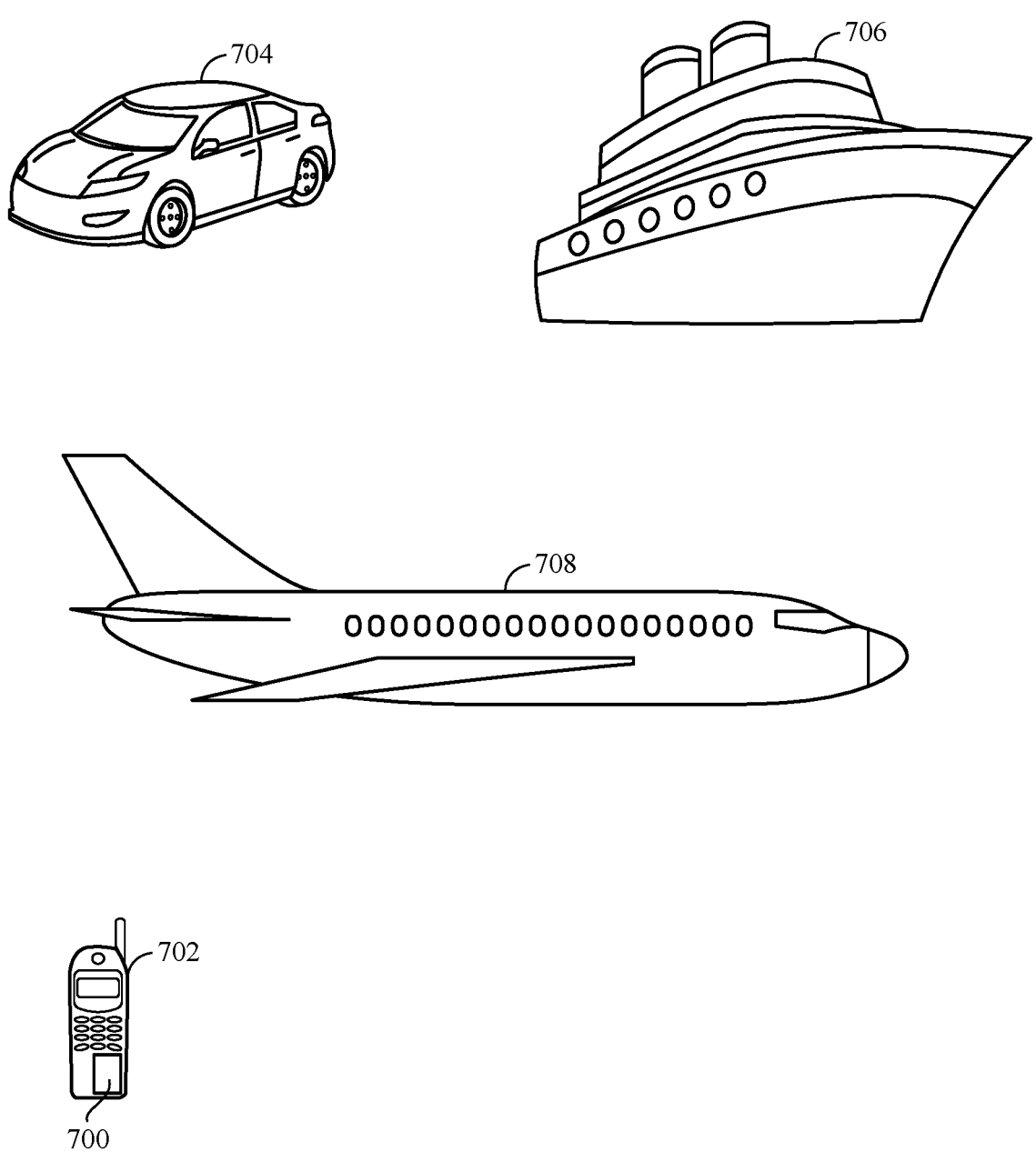
FIG. 7 illustrates various electronic devices that may be integrated with any of the aforementioned integrated device, semiconductor device, integrated circuit, die, interposer, package or package-on-package (PoP) in accordance with some examples of the disclosure.

FIG. 7 illustrates various electronic devices that may be integrated with any of the aforementioned SoCs in accordance with some examples of the disclosure. For example, a mobile phone device 702, an automotive vehicle 704, a mobile vehicle such as a watercraft 706 or an aircraft 708 may include an integrated device 700 as described herein. The integrated device 700 may be, for example, any of the integrated circuits, SoCs, registers, logic circuits described herein. The devices 702, 704, 706, and 708 illustrated in FIG. 7 are merely exemplary. Other electronic devices may also feature the integrated device 700 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), or any other device that stores or retrieves data or computer instructions, or any combination thereof.

It will be appreciated that various aspects disclosed herein can be described as functional equivalents to the structures, materials and/or devices described and/or recognized by those skilled in the art. For example, in one aspect, an apparatus may comprise a processing means (see, e.g., 130 and 140 in FIG. 1), a means for sensing (see, e.g., 110 in FIG. 1), coupled to the processing means, and a control means (see, e.g., 120 in FIG. 1) coupled to the sensing means and the processing means. Such an apparatus may further include a means for monitoring (see, e.g., 512 and 514 in FIG. 5) coupled to the sensing means. It will be appreciated that the aforementioned aspects are merely provided as examples and the various aspects claimed are not limited to the specific references and/or illustrations cited as examples.

One or more of the components, processes, features, and/or functions illustrated in FIGS. 1-7 may be rearranged and/or combined into a single component, process, feature or function or incorporated in several components, processes, or functions. Additional elements, components, processes, and/or functions may also be added without departing from the disclosure. It should also be noted that FIGS. 1-7 and its corresponding description in the present disclosure is not limited to dies and/or ICs. In some implementations, FIGS. 1-7 and its corresponding description may be used to manufacture, create, provide, and/or produce integrated devices. In some implementations, a device may include a die, an integrated device, a die package, an integrated circuit (IC), and/or a SoC.

In this description, certain terminology is used to describe certain features. The term "mobile device" or "mobile computing device" can describe, and is not limited to, a navigation device, a communications device, a mobile device, a mobile phone, a smartphone, a personal digital assistant, a tablet computer, a computer, a wearable device, a laptop computer, a mobile vehicle, an automotive device in an automotive vehicle. Further, the terms "user equipment" (UE), "mobile terminal," "mobile device," and "wireless device," can be interchangeable.

The wireless communication between electronic devices can be based on different technologies, such as code division multiple access (CDMA), W-CDMA, time division multiple access (TDMA), frequency division multiple access (FDMA), Orthogonal Frequency Division Multiplexing (OFDM), Global System for Mobile Communications (GSM), 3GPP Long Term Evolution (LTE), Bluetooth (BT), Bluetooth Low Energy (BLE) or other protocols that may be used in a wireless communications network or a data communications network. Bluetooth Low Energy (also known as Bluetooth LE, BLE, and Bluetooth Smart) is a wireless personal area network technology designed and marketed by the Bluetooth Special Interest Group intended to provide considerably reduced power consumption and cost while maintaining a similar communication range. BLE was merged into the main Bluetooth standard in 2010 with the adoption of the Bluetooth Core Specification Version 4.0 and updated in Bluetooth 5 (both expressly incorporated herein in their entirety).

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples and is not intended to be limiting of examples of the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, actions, operations, elements, and/or components, but do not preclude the presence or addition of one or more other features, integers, actions, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be incorporated entirely within any form of computer-readable storage medium having stored therein a corresponding set of computer instructions that upon execution would cause an associated processor to perform the functionality described herein. Thus, the various aspects of the disclosure may be incorporated in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, action, feature, benefit, advantage, or equivalent to the public, regardless of whether the component, action, feature, benefit, advantage, or the equivalent is recited in the claims.

Further, those of skill in the art will appreciate that the various illustrative logical blocks, modules, circuits, and algorithm actions described in connection with the examples disclosed herein may be implemented as electronic hardware, computer software, or combinations of both. To clearly illustrate this interchangeability of hardware and software, various illustrative components, blocks, modules, circuits, and actions have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be incorporated directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art including non-transitory types of memory or storage mediums. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method action or as a feature of a method action. Analogously thereto, aspects described in connection with or as a method action also constitute a description of a corresponding block or detail or feature of a corresponding device. Some or all of the method actions can be performed by a hardware apparatus (or using a hardware apparatus), such as, for example, a microprocessor, a programmable computer or an electronic circuit. In some examples, some or a plurality of the most important method actions can be performed by such an apparatus.

In the detailed description above it can be seen that different features are grouped together in examples. This manner of disclosure should not be understood as an intention that the claimed examples have more features than are explicitly mentioned in the respective claim. Rather, the disclosure may include fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods, systems, and apparatus disclosed in the description or in the claims can be implemented by a device comprising means for performing the respective actions of this method.

Furthermore, in some examples, an individual action can be subdivided into a plurality of sub-actions or contain a plurality of sub-actions. Such sub-actions can be contained in the disclosure of the individual action and be part of the disclosure of the individual action.

While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A sensor control apparatus, comprising:
a first System on Chip (SoC) configured to generate a first sensor configuration value for a sensor parameter;
a second SoC configured to generate a second sensor configuration value for the sensor parameter;
a sensor communicatively coupled to the first SoC and the second SoC; and
a control logic circuit communicatively coupled to the first SoC, the second SoC, and the sensor, wherein the control logic circuit is configured to select between the first SoC and the second SoC as a host SoC in response to a command from the first SoC to lock the sensor or in response to a command from the second SoC to lock the sensor or both and to apply to the sensor one of the first configuration value or the second configuration value for the sensor parameter based on the selected host SoC.

2. The sensor control apparatus of claim 1, wherein the sensor is a camera.

3. The sensor control apparatus of claim 1, further comprising a monitor communicatively coupled to the control logic circuit, the sensor, the first SoC, and the second SoC, wherein the monitor is configured to:
record a number of register updates from the host SoC;
determine if the number of register updates exceeds a threshold;
deselect the host SoC when the number of register updates does not exceed the threshold; and
broadcast a release signal to the control logic circuit, the first SoC, and the second SoC when the selected host SoC is deselected.

4. The sensor control apparatus of claim 1, wherein the control logic circuit is further configured to transmit information about the selected host SoC to a non-selected SoC.

5. The sensor control apparatus of claim 1, wherein the sensor is a radar.

6. The sensor control apparatus of claim 1, wherein the sensor comprises a sensor interface that is controlled by the selected host SoC.

7. The sensor control apparatus of claim 1, wherein the sensor control apparatus is incorporated into a device selected from the group consisting of a navigation device, a communications device, a mobile device, a mobile phone, a smartphone, a personal digital assistant, a tablet computer, a computer, a wearable device, a laptop computer, a mobile vehicle, and an automotive vehicle.

8. A method for controlling a sensor, the method comprising:
generating a first sensor configuration value for a sensor parameter by a first System on Chip (SoC) communicatively coupled to the sensor and a control logic circuit;
generating a second sensor configuration value for the sensor parameter by a second SoC communicatively coupled to the sensor and the control logic circuit;
selecting between the first SoC and the second SoC as a host SoC in response to a command from the first SoC to lock the sensor or in response to a command from the second SoC to lock the sensor or both; and
applying one of the first configuration value or the second configuration value for the sensor parameter based on the selected host SoC.

9. The method of claim 8, wherein the sensor is a camera.

10. The method of claim 8, further comprising:
recording, by a monitor communicatively coupled to the control logic circuit, the sensor, the first SoC, and the second SoC, a number of register updates received from the selected host SoC;
determining, by the monitor, if the number of register updates exceeds a threshold;
deselecting, by the monitor, the selected host SoC when the number of register updates does not exceed the threshold; and
broadcasting, by the monitor, a release signal to the control logic circuit, the first SoC, and the second SoC when the selected host SoC is deselected.

11. The method of claim 8, further comprising transmitting, by the control logic circuit, information about the selected host SoC to a non-selected SoC.

12. The method of claim 8, wherein the sensor is a radar.

13. The method of claim 8, wherein the sensor comprises a sensor interface that is controlled by the selected host SoC.

14. The method of claim 8, wherein the method is performed by a device selected from the group consisting of a navigation device, a communications device, a mobile device, a mobile phone, a smartphone, a personal digital assistant, a tablet computer, a computer, a wearable device, a laptop computer, a mobile vehicle, and an automotive vehicle.

15. A non-transitory computer-readable medium comprising instructions that when executed by a processor cause the processor to perform a method comprising:
generating a first sensor configuration value for a sensor parameter by a first System on Chip (SoC) communicatively coupled to a sensor and a control logic circuit;
generating a second sensor configuration value for the sensor parameter by a second SoC communicatively coupled to the sensor and the control logic circuit;
selecting between the first SoC and the second SoC as a host SoC in response to a command from the first SoC to lock the sensor or in response to a command from the second SoC to lock the sensor or both; and
applying one of the first configuration value or the second configuration value for the sensor parameter based on the selected host SoC.

16. The non-transitory computer-readable medium of claim 15, wherein the sensor is a camera.

17. The non-transitory computer-readable medium of claim 15, wherein the method further comprises:
- recording, by a monitor communicatively coupled to the control logic circuit, the sensor, the first SoC, and the second SoC, a number of register updates received from the selected host SoC;
- determining, by the monitor, if the number of register updates exceeds a threshold;
- deselecting, by the monitor, the selected host SoC when the number of register updates does not exceed the threshold; and
- broadcasting, by the monitor, a release signal to the control logic circuit, the first SoC, and the second SoC when the selected host SoC is deselected.

18. The non-transitory computer-readable medium of claim 15, wherein the method further comprises transmitting, by the control logic circuit, information about the selected host SoC to a non-selected SoC.

19. The non-transitory computer-readable medium of claim 15, wherein the sensor is a radar.

20. The non-transitory computer-readable medium of claim 15, wherein the sensor comprises a sensor interface that is controlled by the selected host SoC.

* * * * *